(12) United States Patent
Ye (10) Patent No.: US 6,321,207 B1
(45) Date of Patent: Nov. 20, 2001

(54) SYSTEM AND METHOD FOR OPTIMIZING THE ALLOCATION OF A RESOURCE

(75) Inventor: Jian Ye, Quincy, MA (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/292,644

(22) Filed: Apr. 15, 1999

(51) Int. Cl.[7] .................................................. G06F 17/60
(52) U.S. Cl. ...................................... 705/8; 705/7
(58) Field of Search ............................. 705/7, 8, 9, 28

(56) References Cited

U.S. PATENT DOCUMENTS 6,021,402 * 2/2000 Takriti .................................. 705/412
6,064,981 * 5/2000 Barni et al. ............................ 705/26

FOREIGN PATENT DOCUMENTS

WO-200116665 A23/2001 (WO) .
WO-200048109 A18/2000 (WO) .............................. G06F/17/60

OTHER PUBLICATIONS

Bradley et al., "Applied Mathematical Programming," 1977, Addison–Wesley Publishing Company, pp. 387–398.*
Murphy, "transportation Management Systems Optimize Shipment Planning and Execution," Keller International Publishing, Feb. 1998, 9 pages.*
Brandt, "Software Attempts to Simplify Lane Bidding," Transport Topics, Feb. 16, 1998, 3 pages.*
PR Newswire, "i2 Technologies and InterTrans Logistics Agree to Merge," Mar. 24, 1998, 2 pages.*
PR Newswire, "CAPS Logistics, Inc., A Baan COmpany, Launches BidPro™ for Carrier Bid Optimization," Apr. 26, 1999, 2 pages.*
Kutanoglu et al., "On combinatorial auction and Lagrangian relaxation for distributed resource scheduling," IIE Transactions, Sep. 1999, 17 pages.*
M2 Presswire, "INTERTRANS: InterTrans introduces leading edge transportation purchasing tool," Feb. 10, 1998, 1 page.*
Veeramani, D., "Task and Resource Allocation Via Auctioning," Proc. of the 1992 Winter Simulation Conference, XP–000957604, pp. 945–954, Dec. 13, 1992.
Walsh, W.E., et al., "Some Economics of Market–Based Distributed Scheduling," Proc. of the 18th Int. Conf. on Distributed Computing Systems, XP–002151676, pp. 612–621, May 26–29, 1998.
Geppert, A., et al., "Market–Based Workflow Management," Proc. of the Int. IFIP/GI Working Conference for Electronic Commerce, XP000956169, pp. 179–191, Jun. 3–5, 1998.
International Search Report, Nov. 15, 2000.
"Integer and Combinatorial Optimization," George L. Nemhauser and Laurence A. Wolsey, A Wiley Interscience Publication, pp. 265–270 and 459–465, Copyright 1988.

* cited by examiner

Primary Examiner—Tariq R. Hafiz
Assistant Examiner—Marc Norman
(74) Attorney, Agent, or Firm—Baker Botts L.L.P.

(57) ABSTRACT

A system (8) for optimizing the allocation of a resource includes an optimizer file (14) containing resource allocation data including a demand and multiple bids for the resource, each bid including at least a unit price for the resource. An optimizer engine (16) coupled to the file (14) receives the data and generates priorities for at least some of the bids according to their unit prices. The engine (16) generates an integer program according to the data and communicates the priorities in association with the integer program. A solver (18) coupled to the engine (16) receives the priorities and the integer program. The solver (18) generates a solution to the integer program using the priorities, the solution optimizing the allocation of the resource subject to the demand and the bids.

30 Claims, 4 Drawing Sheets

SYSTEM AND METHOD FOR OPTIMIZING THE ALLOCATION OF A RESOURCE

RELATED APPLICATIONS

This application is related to U.S. application Ser. No. 09/292,528, entitled "System and Method for Optimizing the Allocation of a Resource."

TECHNICAL FIELD OF THE INVENTION

This invention relates in general to the field of optimization systems and methods, and more particularly to a system and method for optimizing the allocation of a resource.

BACKGROUND OF THE INVENTION

Many businesses and other types of organizations wish to optimize the manner in which they allocate various resources to reduce costs and improve efficiency. For example, a shipper of goods might wish to optimize the allocation of transportation capacity among multiple competing carriers in a way that minimizes shipping costs while satisfying the shipper's coverage, equipment, service, and other requirements. It is often desirable to optimize the allocation of such resources using computer-based systems that incorporate software specifically tailored to solve optimization problems using standard "brute force" approaches. For example, commercially available integer program solvers such as CPLEX and XPRESS may in some circumstances be used in an attempt to optimize a shipper's allocation of transportation capacity.

As the resource allocation needs of business and other organizations continue to increase in their complexity and importance, the speed, efficiency, and accuracy in which resources are allocated have become increasingly critical to the success of the organizations. However, previous systems and methods for optimizing the allocation of resources are inadequate for many optimization scenarios. For example, integer program solvers such as CPLEX and XPRESS may use a standard branch-and-bound approach in an attempt to solve optimization problems that are formulated as integer programs, but are often unable to solve even relatively small such problems in a brute force manner before overloading the memory of even the most powerful computers. Even where these solvers incorporate additional algorithms or other techniques in an attempt to reduce the size and complexity of the optimization problem, they are often too slow and require too much processing power to be of practical value. These and other deficiencies make previous systems and methods for optimizing allocation of resources inadequate for many purposes.

SUMMARY OF THE INVENTION

According to the present invention, the disadvantages and problems associated with previous optimization systems and methods have been substantially reduced or eliminated.

According to one embodiment of the present invention, a system for optimizing the allocation of a resource includes an optimizer file containing resource allocation data including a demand and multiple bids for the resource, each bid including at least a unit price for the resource. An optimizer engine coupled to the file receives the data and generates priorities for at least some of the bids according to their unit prices. The engine also generates an integer program according to the data and communicates the priorities in association with the integer program. A solver is coupled to the engine and receives the priorities and the integer program. The solver generates a solution to the integer program using the priorities, the solution optimizing the allocation of the resource subject to the demand and the bids. In another embodiment, the engine may generate an enhanced integer program that incorporates one or more cuts to further improve the optimization process.

The system and method of the present invention provide numerous important technical advantages. The present invention allows the allocation of a resource, such as one or more shipping lanes for example, to be optimized quickly, efficiently, and accurately relative to standard "brute force" approaches for solving integer programs. Furthermore, the present invention may optimize the allocation of a resource where previous systems and methods are unable to provide any solution due to insufficient computer memory or other limitations. The present invention generates priorities for at least some bids on a lane according to a comparison of their unit prices on the lane to allow a solver to generate an acceptable solution to the integer program quickly, efficiently, and accurately relative to previous optimization techniques. The priorities generated according to the present invention may be particularly effective for solving optimization problems when used in combination with cuts generated according to the present invention. Other important technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
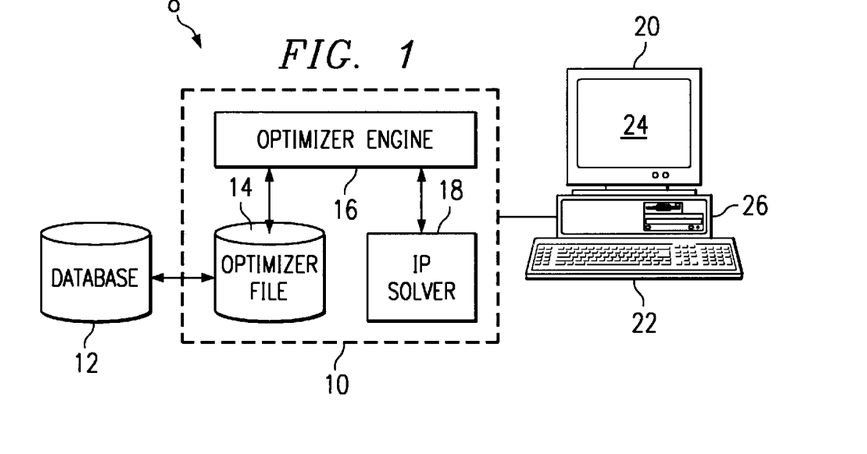
FIG. 1 illustrates an exemplary system for optimizing the allocation of a resource according to the present invention.

FIG. 1 illustrates an exemplary system 8 for optimizing the allocation of a resource within a business or other appropriate environment. Although resources are discussed primarily as being shipping lanes that must be allocated among multiple carriers to satisfy the shipping demand of one or more suppliers or other shippers of goods, the present invention contemplates system 8 optimizing the allocation of any suitable resource. As an example, other particular resources might be parts used in a manufacturing process, and allocation of the resources might involve obtaining parts from among multiple parts suppliers to satisfy demand for these parts. As another example, other particular resources might be groceries or other goods that are sold in a commercial establishment, and allocation of the resources might involve obtaining goods from among multiple suppliers of these goods to satisfy demand for these goods. As these two alternative examples illustrate, the allocation of resources may involve obtaining resources from among multiple sources, and allocation as that term is used in connection with the present invention is not limited to the distribution of resources among multiple recipients as in the case of shipping lanes.

Shipping lanes may be defined by one or more shippers, by one or more carriers that transport goods for shippers, or in any other suitable manner. In one embodiment, each lane represents a corresponding transportation route between two geographic locations and may also incorporate in its definition constraints such as equipment constraints, service constraints, and any other suitable constraints. For example, a shipper might define a particular lane to be a rush delivery using refrigerated vehicles between Dallas, Tex. and Boston, Mass. System 8 optimizes the allocation of shipping lanes among multiple competing carriers that bid on lanes and groups of lanes, sometimes referred to as lane bundles, to obtain the right to satisfy some or all of the shipper's demand with respect to those lanes. In one embodiment, bundling of lanes may allow carriers to take better advantage of local transportation networks to identify more continuous routes and better utilize their assets.

System 8 includes an optimizer 10 and a database 12. In one embodiment, database 12 may contain, without limitation: (a) shipper or carrier supplied definitions of lanes and lane bundles; (b) the shipper's shipping demand with respect to each lane; (c) one or more equipment, service, or any other shipper-related constraints; (d) one or more capacity, selection, fixed cost, or any other carrier-generated constraints; (e) carrier bids associated with one or more lanes or lane bundles, each bid including a bid amount reflecting the number of units the carrier is willing to ship in each lane, a bid price reflecting the cost to ship these units in the lane, and possibly a bid unit price reflecting the shipping cost per unit in the lane; (f) carrier reserve bids associated with one or more lanes or lane bundles, including a maximum bid amount reflecting the number of units the carrier is willing to ship in each lane on a per unit basis and a unit price reflecting the per unit shipping cost in the lane; and (g) any other information appropriate for optimizing the allocation of transportation capacity among multiple carriers. In general, this information may be referred to herein as resource allocation data where appropriate.

In one embodiment, database 12 is a MICROSOFT ACCESS database, some or all of whose contents are imported into database 12 using one or more EXCEL or other suitable spread sheets. Database 12 and an associated database management system (DBMS) cooperate to provide appropriate information to optimizer 10 during the operation of system 8. Database 12 may include one or more storage locations, in any suitable form, on a single or multiple computers at a single or multiple physical locations. Database 12 is coupled directly or indirectly to optimizer 10 using any appropriate wireline, wireless, or other communications link.

Optimizer 10 includes an optimizer file 14, an optimizer engine 16, and an integer program (IP) solver 18. During the operation of system 8, contents of database 12 are communicated to and stored in optimizer file 14, before, during, or both before and during the operation of optimizer 10, in whole or in any suitable part. File 14 can be loaded and its contents viewed using a suitable graphical user interface (GUI) associated with optimizer 10 and computer 20. A user may also be provided with the option to store information, such as a solution to the optimization problem, in file 14 using the associated GUI. Although file 14 is discussed as being a file, the present invention contemplates file 14 having any suitable data storage format.

In general, optimizer 10 is a strategic decision-support tool that shippers use to allocate transportation capacity. in the form of lanes and lane bundles, from among multiple competing carriers. Optimizer 10 allows shippers and carriers to collaborate to drive down or otherwise reduce shipping costs in what may be, in some situations, a mutually beneficial manner. In particular, shippers use optimizer 10 to allocate lanes and lane bundles to carriers in a way that, to the extent possible, minimizes the total shipping costs that the shipper must bear while satisfying the shipper's coverage, equipment, service, and other requirements.

In one embodiment, a shipper associated with system 8 invites or otherwise prompts carriers to submit bids, each bid spanning one or more lanes or lane bundles. As a result of bids being received from some or all of these carriers, each lane will have, for each bid spanning the lane, a corresponding bid amount, bid price, and bid unit price. The bid unit price may be submitted with the bid or may be subsequently determined based on the bid amount and bid price. A bid may be awarded in whole or rejected in whole, but may not be awarded in part. For example, if a bid to ship two hundred units on a particular lane is received, either two hundred units are awarded to the carrier associated with the bid or zero units are awarded to the carrier based on the bid. Carriers may also submit reserve bids with respect to individual lanes. Reserve bids are submitted on a per unit basis, up to a maximum bid amount, and may therefore be awarded in whole, rejected in whole, or awarded in any part. A reserve bid is often more expensive on a unit price basis, but gives the shipper flexibility to make use of the entire reserve bid or any suitable portion thereof according to particular needs. Optimizer 10 awards bids and reserve bids among multiple competing carriers in a way that minimizes the total shipping cost while satisfying the shipper's demand and other requirements. In one embodiment, optimizer 10 may award some or all of these bids and reserve bids subject to carrier constraints such as capacity, selection, fixed cost, and the like.

Optimizer 10 allows the shipper to carry out multiple rounds of bidding, which helps to further drive down costs through additional competition among carriers. After each round of bidding, optimizer 10 selects the combination of bids and reserve bids that minimizes the total shipping cost over all lanes, and provides this information to some or all of the carriers involved in the bidding process. Based on this feedback information, carriers may revise their bids and reserve bids to submit new bids and reserve bids for the next round of bidding, in hopes of either altering the outcome or ensuring their victory. This process continues until a predetermined iteration limit is reached. Since carriers get feedback after each round of bidding and are able to revise their bids and reserve bids accordingly, costs to the shipper are typically driven down as a result of the competitive process. In addition, since all lanes may not be spanned after the first or even subsequent rounds of bidding, multiple rounds help to increase the likelihood that the shipper's demand is completely satisfied.

In one embodiment, optimizer 10 maintains all the bids and reserve bids for all rounds of bidding, whether they are provisionally awarded or rejected, until the final round of bidding is complete. For example, in the fourth round of bidding, optimizer may process the bids and reserve bids from some or all three previous rounds in addition to the bids and reserve bids submitted in the fourth round. Maintaining bids and reserve bids in this manner takes into account the possibility that a bid or reserve bid submitted in an earlier round may ultimately turn out to be the best bid or reserve bid the shipper receives. Bids may be maintained using database 12, file 14, or local memory associated with optimizer engine 16, in any combination.

In general, optimizer engine 16 accesses some or all of the contents of file 14 to retrieve appropriate information during operation of optimizer 10 and generates one or more solutions according to this information. In one embodiment, a solution will identify the particular bids and reserve bids to be awarded from among all bids and reserve bids submitted. Optimizer engine 16 accesses information in optimizer file 14 to formulate the applicable shipping cost minimization problem as an integer program, which in general is a problem of maximizing or minimizing a function of numerous variables subject to certain inequality constraints, equality constraints, and integrality restrictions on some or all of the variables. The bids are treated as binary variables, since they must be either awarded in whole or rejected in whole, and the reserve bids are treated as continuous variables, since they may be awarded in whole, rejected in whole, or awarded in any part. When the integrality restrictions on some or all variables are eliminated or otherwise relaxed, an integer program may be referred to as a linear program (LP).

Integer programs have been used in modeling a wide variety of large-scale management and planning problems to, for example, increase productivity or reduce cost. Integer programs typically belong to a class of problems referred to as "no polynomial" (NP) problems, for which no polynomial time algorithm for solving the problems has been found and for which solving time typically grows exponentially as the problem increases in size. Even relatively small integer programs may present tremendous difficulties for even the best commercially available IP solvers. such as CPLEX or XPRESS, which use the standard branch-and-bound approach with LP relaxation to solve, or to attempt to solve, integer programs. The branch-and-bound approach is described more fully below with reference to FIG. 2.

The LP relaxation solution of an integer program is a solution obtained after eliminating the integrality constraints on some or all of the variables; that is, when some or all of the variables are treated as continuous rather than binary variables. The LP relaxation solution provides a value for each variable, for example, each bid and reserve bid, involved in the associated optimization problem and includes, in this example, a total shipping cost associated with the values provided. The LP relaxation solution is typically obtained efficiently and provides a lower bound for the integer program; that is, the LP relaxation solution is at least as good as the optimal real solution to the integer program. Accordingly, real solutions may be compared with the LP relaxation solution to determine their relative desirability. However, LP relaxation solutions can be misleading in certain circumstances, in that they can indicate particular subsets of the solution space are relatively promising when in fact no desirable real solutions are to be found within these subsets.

Optimizer engine 16 communicates information to and receives information from IP solver 18, which in one embodiment is a commercially available IP solver such as CPLEX or XPRESS. Optimizer engine 16 uses selected resource allocation data received from file 14, one or more LP relaxation solutions received from IP solver 18, or any appropriate combination of this information to construct one or more enhanced integer programs reflecting the applicable optimization problem. In accordance with the present invention, optimizer engine 16 enhances a standard integer program using a cutting process, a prioritizing process, or both of these processes to help improve the speed, efficiency, and accuracy with which IP solver 18 may solve the corresponding optimization problem, according to particular needs.

In one embodiment, optimizer engine 16 constructs a standard integer program and applies the prioritizing process of the present invention to generates priorities for some or all bids. Optimizer engine 16 communicates the standard integer program to IP solver 18 as a linear program and, in response, receives an LP relaxation solution to the linear program from IP solver 18. If no solution is received from IP solver 18 or if the LP relaxation solution to the linear program is fractional or otherwise unacceptable for some reason, optimizer engine 16 will enhance the integer program in accordance with the cutting process of the present invention. Optimizer engine 16 then communicates the enhanced integer program to IP solver 18 as a linear program and, in response, may receive an LP relaxation solution to the linear program from IP solver 18. If no solution is received from IP solver 18 or if the LP relaxation solution to the linear program is fractional or otherwise unacceptable for some reason, optimizer engine 16 further enhances the enhanced integer program according to the cutting process. Optimizer engine 16 communicates the resulting enhanced integer program to IP solver 18 as a linear program and, in response, may receive an LP relaxation solution to the linear program from IP solver 18. This procedure continues recursively until optimizer 16 receives an acceptable integral LP relaxation solution to a linear program from IP solver 18 or until an iteration limit is reached.

Once an acceptable integral solution to a linear program is received from IP solver 18, optimizer engine 16 communicates the enhanced integer program to IP solver 18 as an integer program rather than as a linear program. IP solver 18 generates an integral solution to the enhanced integer program and communicates the solution to optimizer engine 16. Optimizer engine 16 may communicate the solution to file 14, with or without input from a user of optimizer 10, where it is stored and may be viewed using the associated GUI. In one embodiment, the user is visually provided with the solution and given the option to store the solution in file 14, to provide appropriate additional information and request another solution, or both of these options. The operation of system 8 in connection with the prioritizing and cutting processes of the present invention is described more fully below with reference to FIGS. 3 through 6.

Optimizer 10 may operate on one or more computers 20 that are integral to or separate from the hardware and software that support optimizer file 14, optimizer engine 16, and IP solver 18. Computer 20 may include a suitable input device 22, such as a keypad, mouse, touch screen, microphone, or other device to input information. An output device 24 may convey information associated with the operation of optimizer 10, including digital or analog data, visual information, or audio information. Computer 20 may include fixed or removable storage media, such as magnetic computer disks, CD-ROM, or other suitable media to receive output from and provide input to optimizer 10. Computer 20 may include a processor 26 and volatile or non-volatile memory to execute instructions and manipulate information according to the operation of optimizer 10. Although only a single computer 20 is shown, file 14, optimizer engine 16, and IP solver 18 may each operate on separate computers 20 or may operate on one or more shared computers 20 without departing from the intended scope of the present invention. Moreover, database 12 may operate on one or more computers 20 or any other suitable computers.

Figure 2:
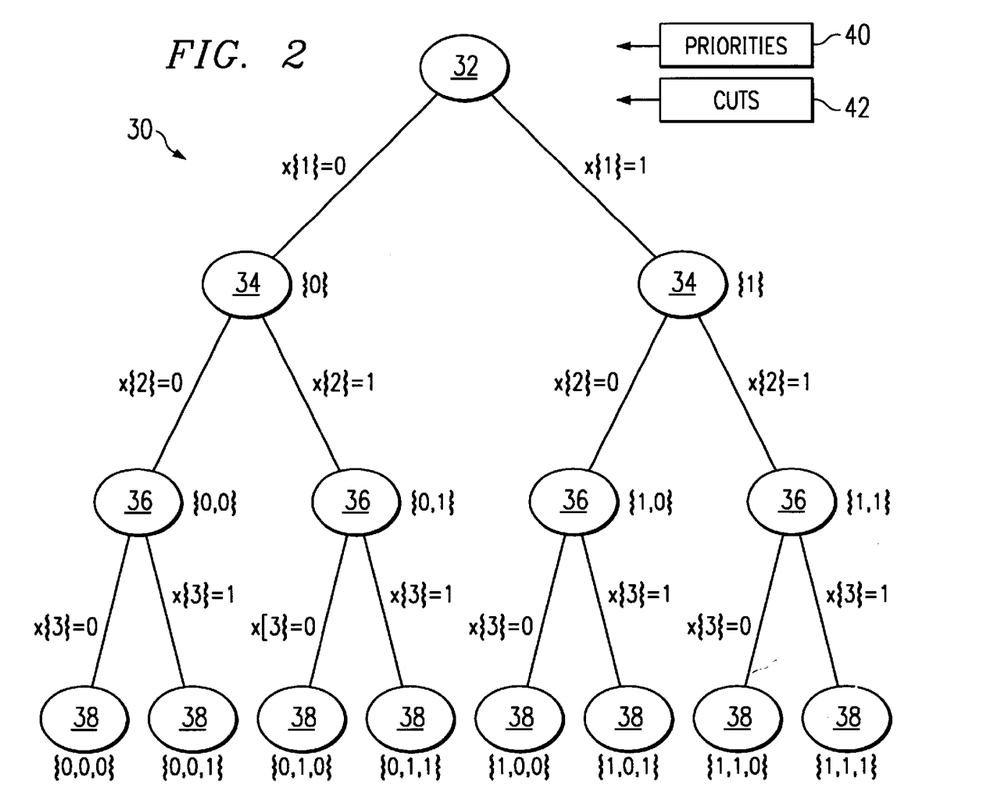
FIG. 2 illustrates an exemplary branch-and-bound tree.

The branch-and-bound approach to generating an LP relaxation solution to an integer program involves a solution tree having nodes from which branches extend according to the two possible values of the binary variables associated with the nodes. FIG. 2 illustrates an exemplary branch-and-bound tree 30 that includes nodes 32, 34, 36, and 38 at multiple levels within the solution space of the corresponding integer program. Node 32 is referred to as the root of tree 30, from which tree 30 is branched on an arbitrarily selected binary variable x[1] that must have either "0" or "1" as its value. Binary variable x[1] corresponds to a particular carrier bid, which as discussed above can only be awarded in whole or rejected in whole. Because x[1] can only take one of two values in any particular solution to the integer program, two branches extend from root node 32 to nodes 34, each of the branches being associated with a different value of x[1].

An LP relaxation solution is first generated for root node 32. If this solution is not integral, meaning that at least one binary variable has a fractional value in the solution, then one binary variable x[1] is selected from the set of all such variables for branching on first within tree 30. Typically, the selected x[1] has a fractional value within the LP relaxation solution. Strategies for selecting particular binary variables on which to branch within tree 30, and for determining the order in which the binary variables are branched upon within tree 30, may rely on one or more user-specified priorities, priorities generated according to previous techniques, or preferably priorities generated according to the prioritizing process of the present invention discussed more fully below.

As a simple example, if the bid amounts for three binary variables x[1], x[2], and x[3] were each "200" units on a lane and the shipper's demand for the lane was "250" units, the LP relaxation solution for root node 32 might be x[1]=0.5, x[2]=0.75, and x[3]=0, meaning that this particular combination of values minimized the total shipping cost while satisfying the shipper's demand on the lane. However, this LP relaxation solution is not a real solution, because the real bids corresponding to the variables x[1] and x[2] cannot be partially awarded as the LP relaxation solution would require. Therefore, the LP relaxation solution provides a lower bound to the integer program solution that all real solutions to the optimization problem must equal or, as is more likely in typical optimization scenarios, exceed.

If the LP relaxation solution does not yield an integral solution for x[1], such that x[1] has a fractional value as in the simple example discussed above, the branch-and-bound approach requires the optimization problem to be divided into two subsets. The first subset corresponds to x[1]=0 and the second subset corresponds to x[1]=1. One of the subsets of the integer program, x[1]=1 for example, is then solved using LP relaxation, ideally yielding integral solutions for all remaining variables, x[2] and x[3] in this example. In this case, the most optimal real solution, given the constraint that x[1]=1, has been found and equals the LP relaxation solution. Note that since x[1] is constrained so that x[1]=1, the LP relaxation solution for corresponding node 34 is in general less optimal than the LP relaxation solution for root node 32, which was determined with no integrality constraints. Continuing the simple example discussed above, with the bid amounts for variables x[1], x[2], and x[3] each being "200" units on the lane and the shipper's demand for the lane being "250" units, the LP relaxation solution for node 34 might be x[1]=1, x[2]=0.25, and x[3]=0.

If LP relaxation yields fractional values for one or more remaining variables (recall that x[1] was constrained such that x[1]=1), variable x[2] for example, then branching is required at node 34 to constrain the value of x[2] to "0" or "1" and the problem is again divided into two subsets. The first subset corresponds to x[1]=1 and x[2]=0, and the second subset corresponds to x[1]=1 and x[2]=1. One subset of the integer program, x[1]=1 and x[2]=0 for example, is then solved using LP relaxation, ideally yielding integral solution for all remaining variables, x[3] in this example. In this case, the most optimal solution, given the constraint that x[1]=1 and x[2]=0, has been found and equals the LP relaxation solution. Again note that since both x[1] and x[2] have been constrained with respect to their values, the LP relaxation solution for corresponding node 36 is less optimal than the LP relaxation solutions for either root node 32 or node 34.

This procedure is continued recursively, branching on each variable having a fractional value in a previous LP relaxation solution, until an LP relaxation solution is found having integral solutions for all the binary variables associated with the integer program. Branch-and-bound tree 30 is shown having a height of four, corresponding to branching and LP relaxation involving just three binary variables x[1], x[2], and x[3]. The brackets associated with each node on tree 30 indicate the constrained values of variables branched upon above the node within tree 30. For example, {1, 0, 1} associated with a particular node 38 reflects the constraint that x[1]=1, x[2]=0, and x[3]=1. Branch-and-bound tree 30 may be explored purely in depth, in which case tree 30 is explored as deeply as possible along a series of branches connecting root node 32, a single node 34, a single node 36, and a single node 38. Tree 30 may be explored purely in breadth, in which case all nodes within a level are explored before any nodes within the adjacent lower level are explored. In one embodiment, tree 30 is explored using a suitable combination of depth and breadth exploration. The simple tree 30 and examples discussed above are for illustrative purposes only and are not intended to limit the scope of the present invention. Those skilled in the art readily appreciate that many such optimization scenarios may be devised, and that the present invention encompasses all such scenarios.

In general, the success of the branch-and-bound approach depends on the size of tree 30. If there are relatively few fractional values in one or more LP relaxation solutions, relatively little branching and thus relatively little processing power and memory may be required. However, the elimination of integrality constraints through LP relaxation typically results in LP relaxation solutions with many fractional values, making tree 30 too large to be realistically handled. For example, since just fifty bids may result in branch-and-bound tree 30 having $(2)^{50}$ nodes, even the most powerful computers available will run out of memory and thus be unable to solve the integer program if the branch-and-bound approach is applied directly. Moreover, since lanes are typically related to one another as a result of combination bids spanning multiple lanes, there may be only one tree 30 for the entire optimization scenario, increasing the complexity of the situation. As a result of these and other deficiencies, commercially available IP solvers 18 such as CPLEX or XPRESS are often unable even to provide an acceptable integral solution to a shipping cost minimization or other optimization problem, much less provide the solution with the speed, efficiency, and accuracy that many organizations increasingly require. Previous techniques for optimizing the allocation of resources are therefore inadequate for the optimization needs of many organizations.

To successfully solve many integer programs associated with optimizing the allocation of resources such as shipping capacity on a lane, it is essential to reduce the size of branch-and-bound tree 30 through pruning one or more portions of tree 30. In general, a subtree associated with a particular branch within tree 30 may be pruned if its associated LP relaxation solution is not an integral solution or does not yield a sufficient number of integer values; its associated LP relaxation solution is more expensive, otherwise less optimal than, or not at least as promising as one or more known integral solutions; or LP relaxation is not feasible for some reason. In these situations, pruning the subtree is based on the fact that LP relaxation solutions will become increasingly less optimal as exploration continues down the subtree, since as discussed more fully above an additional variable must be constrained for each level explored.

To help solve the shipping cost or other optimization problem reflected in the integer program, optimizer engine 16 introduces cuts according to the cutting process of the present invention, as arrow 42 indicates. In one embodiment, since optimizer engine 16 attempts to generate cuts based on the demand constraint for each lane, and since the applicable optimization problem may involve hundreds or even thousands of lanes, optimizer engine 16 may typically generate hundreds or even thousands of cuts. Applying the cutting process to enhance the integer program before attempting to solve the integer program reduces or eliminates the number of fractional values in the LP relaxation solution for at least root node 32, making tree 30 easier to prune and improving the speed and efficiency in which the linear program is solved. With each fractional value removed from the LP relaxation solution according to the cutting process of the present invention, commercially available IP solvers 18 such as CPLEX and XPRESS may in general be able to solve the associated linear program approximately twice as quickly, resulting in tremendous speed and efficiency gains to the organization associated with optimizer 10.

This cutting process also improves the lower bound that the LP relaxation solution provides; that is, cuts introduced according to the cutting process allow the LP relaxation solution for root node 32—the theoretical lower bound on the total shipping cost—to more closely approximate the optimal real, solution. As a result, tree 30 may be more accurately and efficiently pruned based on what appear to be promising LP relaxation solutions. Although in one embodiment one or more cuts are introduced as early as possible in the solution process, at root node 32 for example, the present invention contemplates applying the cutting process to introduce cuts at any suitable node or nodes within branch-and-bound tree 30. As described more fully below, a cut generated according to the cutting process is an appropriate inequality that the values in the LP relaxation solution received from IP solver 18 make untrue or otherwise violate. As described more fully below and as arrow 40 indicates, to help solve the shipping cost or other optimization problem reflected in the integer program. optimizer engine 16 may generate priorities according to the present invention instead of or in addition to generating cuts.

The cutting process of the present invention is based on an important and technically advantageous extension to a maximization problem commonly referred to as the 0-1 Knapsack Problem:

$$\text{Max } \{\Sigma c[i]x[i] \text{ subject to } \Sigma a[i]x[i] \leq b\} \quad (1)$$

where $x[i]$'s are binary variables. The above is referred to as the knapsack problem because it is analogous to a hiker's dilemma in deciding which articles should be put in a knapsack given a weight limitation on how much can be carried. The $c[i]$'s can be interpreted as the values of the articles and the $a[i]$'s can be interpreted as the weights of the articles. In general, a knapsack problem may incorporate multiple constraints, of this sort, in which case the maximization problem may be referred to as a multi-dimensional knapsack problem.

Loosely related to the knapsack problem discussed above, a shipper's demand constraint may be in the form:

$$\Sigma_B A[i]x[i] + \Sigma_R y[j] \geq D[l] \quad (2)$$

where $D[l]$ is the demand for lane l, $x[i]$'s are binary decision variables for bids, $A[i]$'s are the corresponding bid amounts, $y[j]$'s are continuous variables for the number of units awarded based on reserve bids, the first summation is over the set of all bids B, and the second summation is over the set of all reserve bids R. The number of units awarded based on any reserve bid, $y[j]$, is at most the maximum bid amount for the reserve bid, $u[j]$, and may be any number between zero and $u[j]$.

To introduce the concept of a cover inequality, suppose $C_1$ is the set of all bids awarded, which is naturally a subset of the set of all bids B, suppose $C_2$ is the set of all reserve bids awarded, which is naturally a subset of the set of all reserve bids R, and suppose C is the union of $C_1$ and $C_2$. C will be referred to hereafter as the cover, even though the total bid amount of the cover C is generally not sufficient to "cover" the demand. The total bid amount of the cover C is:

$$\Sigma A[i] + \Sigma u[j] \quad (3)$$

where the $x[i]$'s corresponding to the $A[i]$'s are in $C_1$ and the $y[j]$'s corresponding to the $u[j]$'s are in $C_2$. If the total bid amount of the cover C is not enough to satisfy the demand $D[l]$, then at least λ units from the remaining unawarded bids and reserve bids are needed to satisfy the demand:

$$\lambda = D[l] - (\Sigma A[i] + \Sigma u[j]) \quad (4)$$

Expressed in another way:

$$\sum_{B/Cl} \min(\lambda, A[i])x[i] + \sum_{R/C2} y[j] \geq \lambda \quad (5)$$

where the first summation is over the set of remaining unawarded bids in B (excluding the subset of awarded bids $C_1$ in the cover C) and the second summation is over the set of remaining unawarded reserve bids in R (excluding the subset of awarded reserve bids $C_2$ in the cover C). The minimum of λ and $A[i]$, $\min(\lambda, A[i])$, can be used as the coefficient of $x[i]$ because if $x[i]=1$ and $A[i]>1$, then only λ units are needed to satisfy inequality (5). If $x[i]=0$, it does not matter what the coefficient of $x[i]$ is.

For convenience, both sides of inequality (5) can be divided by λ to yield the following cover inequality:

$$\sum_{B/Cl} \min(1, A[i]/\lambda)x[i] + \left(\sum_{R/C2} y[j]\right)/\lambda \geq 1 \quad (6)$$

where the first summation is over the set of remaining unawarded bids in B (excluding the subset of awarded bids $C_1$ in the cover C) and the second summation is over the set of remaining unawarded reserve bids in R (excluding the subset of awarded reserve bids $C_2$ in the cover C). Cover inequality (6) is an extension of a standard knapsack cover inequality in that the standard knapsack cover inequality involves only binary variables $x[i]$'s, while cover inequality (6) additionally takes into account continuous variables y[j]'s. Typically, in an LP relaxation solution, a single one of the variables x[i]'s in cover inequality (6) will have a non-zero fractional value, while all the other variables x[i]'s will have values of zero. This corresponds to a single one of the bids being awarded in whole, while all the other bids are rejected in whole. In this typical case, inequality (6) is clearly violated. In one embodiment, the cutting process of the present invention uses cover inequality (6), or an extended version of cover inequality (6) discussed below, to remove some or all fractional values from the LP relaxation solution through a requirement that each bid be either awarded in whole or rejected in whole.

In general, a first inequality is considered stronger than a second inequality if the first inequality implies the second inequality. For example, the inequality $x \geq 5$ is stronger than $x \geq 3$. In one embodiment, cover inequality (6) may be strengthened if the awarded bids that are in $C_1$ are incorporated into cover inequality (6), a process referred to as lifting the cover inequality. As discussed above, cover inequality (6) was derived under the assumption that the bids in $C_1$ are awarded. If it is further assumed that a particular awarded bid b in $C_1$ is turned off (i.e. x[b]=0), then the value of the lefthand side of cover inequality (6) must increase to satisfy the demand constraint (2). The minimum value of the lefthand side of inequality (6), $\alpha$, is determined as follows:

$$\alpha = \text{Min } \{\Sigma \min(1, A[i]/\lambda) x[i] + (\Sigma y[j])/\lambda\} \tag{7}$$

subject to demand constraint (2) and x[b]=0. The variable x[b] can be lifted according to a lifting coefficient ($\alpha$–1) as follows:

$$(\alpha-1)x[b] + \Sigma \min(1, A[i]/\lambda) x[i] + (\Sigma y[j])/\lambda \geq \alpha \tag{8}$$

Every other binary variable x[i] in the cover C may be lifted in a similar manner. The resulting lifted cover inequality is an extension of a lifted knapsack cover inequality, which is strengthened according to the present invention. Lifted cover inequality (8) is considered stronger than cover inequality (6) in that the right-hand side has been changed to $\alpha$ and ($\alpha$–1)x[b] has been added to the left-hand side, where $\alpha-1 \geq (\alpha-1)x[b]$ if $x[b] \leq 1$. Optimizer engine 16 determines the lifting coefficients for one or more variables to be lifted in the manner described below.

To implement the cutting process of the present invention, optimizer engine 16 takes the shipper's demand constraint on each lane, along with the objective values of all variables in the demand constraint, as input from file 14, from IP solver 18, or both file 14 and IP solver 18 as appropriate. The objective values of the variables are their values in the LP relaxation solution, which optimizer engine 16 may either receive directly from IP solver 18 or retrieve from file 14 after IP solver 18 has generated the LP relaxation solution and the objective values have been stored in file 14. Using this information, optimizer engine 16 generates one or more cuts in the form of violated cover inequalities, violated lifted cover inequalities, or a suitable combination of both violated cover inequalities and violated lifted cover inequalities and incorporates the cuts into the integer program from which IP solver 18 generated the LP relaxation solution. An integer program that incorporates one or more cuts as a result of the cutting process may be referred to as an enhanced integer program, whether or not the prioritizing process has also been or will also be applied. IP solver 18 is more readily able to solve this enhanced integer program reflecting the optimization scenario than the previous integer program.

In one embodiment, there are at least two general steps involved in generating cuts as violated cover inequalities or violated lifted cover inequalities according to the cutting process of the present invention, without limitation. First, an appropriate cover C must be found to generate a suitable cover inequality. Second, the cover inequality is lifted to generate a violated lifted cover inequality. If a cover inequality is lifted according to a first heuristic and objective values in the LP relaxation solution violate the lifted cover inequality, the lifted cover inequality may be incorporated into the integer program as a cut. Optimizer engine 16 may incorporate one or more problem-specific constraints associated with one or more special ordered sets into the lifted cover inequality before determining whether the lifted cover inequality is violated and before incorporating the violated lifted cover inequality into the integer program. Special ordered sets are described more fully below. In one embodiment, if the cover inequality is lifted in accordance with the first heuristic, then optimizer engine 16 may generate one cut during the corresponding iteration of the cutting process—a cut in the form of a violated lifted cover inequality.

In the alternative, if the cover inequality is not lifted according to the first heuristic, then optimizer engine 16 may incorporate one or more problem-specific constraints reflecting one or more special ordered sets into the cover inequality. If objective values in the LP relaxation solution violate the resulting cover inequality, optimizer engine 16 may incorporate the violated cover inequality into the integer program as a cut. In addition, if the cover inequality is not lifted according to the first heuristic, then optimizer engine 16 applies a second heuristic. If the cover inequality is lifted according to the second heuristic and objective values in the LP relaxation solution violate the lifted cover inequality, the violated lifted cover inequality may be incorporated into the integer program as a cut. Optimizer engine 16 may incorporate one or more problem-specific constraints reflecting one or more special ordered sets into the lifted cover inequality before determining whether the lifted cover inequality is violated and before incorporating the violated lifted cover inequality into the integer program. In one embodiment, if the cover inequality is not lifted according to the first heuristic, then optimizer engine 16 may generate two cuts during the corresponding iteration of the cutting process—a first cut in the form of a violated cover inequality and a second cut in the form of a violated lifted cover inequality.

To find an appropriate cover C, the lefthand side of cover inequality (6) should ideally be minimized. However, with the coefficients of the variables x[i]'s being min(1, A[i]/$\lambda$), the problem is nonlinear and typically difficult to solve. Therefore, instead of minimizing the lefthand side of cover inequality (6), in one embodiment optimizer engine 16 applies a greedy heuristic to maximize the corresponding sum in the cover C. Decision variables z[i]'s may be introduced for the x[i]'s, with z[i]=1 if x[i] is in the cover C, and decision variables w[j]'s may be introduced for the y[j]'s, with w[j]=1 if y[j] is in the cover C. The resulting maximization problem may be described as follows:

$$\text{Max } \{\Sigma x^*[i] z[i] + \Sigma y^*[j] w[j] / u[j]\} \text{ subject to} \tag{9a}$$

$$\Sigma z[i] A[i] + \Sigma w[j] u[j] < D[l], \tag{9b}$$

$$z[i]\text{'s and } w[j]\text{'s being binary, and} \tag{9c}$$

$$\text{additional problem-specific constraints}\} \tag{9d}$$

where the x*[i]'s and y*[j]'s are the objective values of the variables x[i]'s and y[j]'s in the LP relaxation solution. The first of the constraints (9b) essentially states that the total bid amount in the cover C is strictly less than the demand D[1]. After receiving an integer program from optimizer engine 16 in the form of the maximization problem set forth in (9a) through (9d), IP solver 18 determines the sets $C_1$ and $C_2$ in the cover C and communicates this information to optimizer engine 16.

As indicated in (9d), one or more additional problem-specific constraints that reflect one or more special ordered sets may be used in determining the cover C. For example, and not by way of limitation, if only at most one of the bids for the variables x[1], x[2], and x[3] may be awarded, such that at most one of the variables x[1], x[2], and x[3] may have a non-zero value, then the problem-specific constraint may be added that z[1]+z[2]+z[3]≦1. This constraint might reflect the fact that x[1], x[2], and x[3] are in reality the same bid submitted in each of the first, second, and third rounds of bidding, respectively. Clearly, in this example, system 8 can award at most one bid from the special ordered set {x[1], x[2], x[3]}. A set of variables, of which at most one variable can have a non-zero value according to the particular optimization problem being addressed, is a type of special ordered set. The present invention contemplates incorporating any suitable special ordered sets and corresponding problem-specific constraints into the maximization problem set forth in (9a) through (9d).

As another example of a special ordered set, if at most U units from among reserve bids y[1], y[2], and y[3] may be awarded, such that at most one of the variables y[1], y[2], and y[3] may have a non-zero value, then y[1]+y[2]+y[3] ≦U and the problem-specific constraint may be added that w[1]+w[2]+w[3]≦1. The special ordered set in this example is {y[1], y[2], y[3]}. The present invention contemplates incorporating any suitable problem-specific constraints, reflecting any suitable special ordered sets, in the maximization problem set forth in (9a) through (9d). In one embodiment, the incorporation of such problem-specific constraints allows optimizer engine 16 to generate stronger cuts, further constraining LP relaxation and increasing the speed, efficiency, and accuracy with which system 8 optimizes the allocation of resources. Incorporation of a problem-specific constraint reflecting a special ordered set into the maximization problem used to determine a cover C provides an important technical advantage over previous techniques. In addition, incorporating a problem-specific constraint reflecting a special ordered set into a cover inequality or a lifted cover inequality that is then incorporated into an integer program provides a further technical advantage over previous techniques.

Optimizer engine 16 uses IP solver 18 to solve the maximization problem set forth in (9a) through (9d). IP solver 18 generates a solution yielding $C_1$ as the set of awarded bids {x[i]|z[i]=1} in the cover C and $C_2$ as the set of awarded reserve bids {y[j]|w[j]=1} in the cover C, which IP solver 18 then communicates to optimizer engine 16. Optimizer engine 16 may determine the cover C as the union of the sets $C_1$ and $C_2$ received from IP solver 18 or, in the alternative, IP solver 18 may determine the cover C as the union of the sets $C_1$ and $C_2$ and then communicate the cover C to optimizer engine 16.

Once the cover C has been found or otherwise determined, optimizer engine 16 attempts to lift variables corresponding to the bids in the cover C using appropriate lifting coefficients. The lifting coefficients depend on the coefficients of some or all of the binary variables involved in the optimization problem, and may equal zero for some variables. For the binary variables in the cover C, a larger coefficient implies a larger lifting coefficient. If the coefficients of the binary variables not in the cover C are larger than the coefficients of binary variables in the cover C, lifting may be difficult or even impossible. In general, if some of the binary variables not in the cover C are instead treated as continuous variables, then larger lifting coefficients may be generated. However, the coefficients of these binary variables in the cover inequality (6) will be $A[i]/\lambda$ instead of min(1, $A[i]/\lambda$), making cover inequality (6) weaker. Thus, there is an inherent balance between the process of lifting and the strength of cover inequality (6). To address this balance, optimizer engine 16 may apply one or more heuristics according to the present invention, providing another important technical advantage over previous techniques.

The first heuristic does not treat any binary variables as continuous variables, such that cover inequality (6) is made as strong as possible. In one embodiment, the coefficients of all the binary variables in the set of remaining unawarded bids in B (excluding the subset of awarded bids $C_1$ in the cover C) that are greater than $\lambda$ are sorted in decreasing order and $\alpha$ determined accordingly. If the coefficients of these binary variables are $A[1] \geq A[2] \geq \ldots A[N] \geq \lambda$ and $A[0]=0$, then the lifting coefficient ($\alpha-1$) for a particular bid b having a coefficient A[b] is determined as follows:

$$\text{If } A[0]+\ldots+A[m] \leq A[b] \leq A[0]+\ldots+A[m+1]-\lambda, \quad (10a)$$

with $0 \leq m \leq N$, then $$\alpha = m+1$$

$$\text{If } A[0]+\ldots+A[m+1]-\lambda \leq A[b] \leq A[0]+\ldots+A[m+1], \quad (10b)$$

with $0 \leq m \leq N$, then $$\alpha = m+2-(A[1]+\ldots+A[m+1]-A[b])/\lambda$$

$$\text{If } A[b] \geq A[0]+\ldots+A[N],$$

then $$\alpha = N+1+(A[b]-A[1]-\ldots-A[N])/\lambda \quad (10c)$$

In one embodiment, optimizer engine 16 determines m and determines which expression (10a), (10b), or (10c) to use as discussed below. In general, for a given m, if $A[b]>A[1]+\ldots+A[m]$, then optimizer engine 16 compares A[b] with $A[1]+\ldots+A[m+1]-\lambda$. If $A[b] \leq A[1]+\ldots+A[m+1]-\lambda$, then it follows that $A[1]+\ldots+A[m]<A[b] \leq A[1]+\ldots+A[m+1]-\lambda$ and expression (10a) is satisfied for the particular m. Note that A[m+1] is greater than $\lambda$. In the alternative, if $A[b]>A[1]+\ldots+A[m+1]-\lambda$, then optimizer engine 16 compares A[b] with $A[1]+\ldots+A[m+1]$. If $A[b] \leq A[1]+\ldots+A[m+1]$, then it follows that $A[1]+\ldots+A[m+1]-\lambda<A[b] \leq A[1]+\ldots+A[m+1]$ and expression (10b) is satisfied for the particular m. The procedure may continue in this manner, with optimizer engine 16 comparing A[b] with increasingly larger sums corresponding to an increasing larger value of m, until the coefficient to be lifted, A[b], is found to be less than such a value. In one embodiment, optimizer engine 16 initially selects m=0.

To further illustrate this procedure starting with m=0, A[b] is first compared with $A[1]-\lambda$. If $A[b] \leq A[1]-\lambda$, then it follows that $0 \leq A[b] \leq A[1]-\lambda$ and expression (10a) is satisfied. In the alternative, if $A[b]>A[1]-\lambda$, then A[b] is next compared with A[1]. If $A[b] \leq A[1]$, it follows that $A[1]-\lambda<A[b] \leq A[1]$ and expression (10b) is satisfied. If neither expression (10a) nor (10b) is satisfied with m=0, optimizer engine 16 will increment m such that m=1. With m=1 and A[b]>A[1], A[b] is next compared with A[1]+A[2]−λ. If A[b]≦A[1]+A[2]−λ, it follows that A[1]<A[b]≦A[1]+A[2]−λ and expression (10a) is satisfied. In the alternative, if A[b]>A[1]+A[2]−λ, then A[b] is next compared with A[1]+A[2]. If A[b]≦A[1]+A[2], it follows that A[1]+A[2]−λ<A[b]≦A[1]+A[2] and expression (10b) is satisfied. The procedure may continue in this manner until A[b] is found to be less than the value with which it is being compared and the appropriate expression (10a) or (10b) selected accordingly. If all A[i]'s have been used without successfully satisfying expression (10a) or (10b), expression (10c) is used.

After lifting of appropriate binary variables in accordance with lifted cover inequality (8), lifted cover inequality (8) may be strengthened through incorporation of one or more additional special ordered sets and associated problem-specific constraints in the manner described more fully above. By way of example only and not by way of limitation, if only at most one of the bids x[1], x[2], and x[3] may be awarded, a special ordered set is {x[1], x[2], x[3]}. If x[1] is in the cover C and not lifted, the coefficients of x[2] and x[3], A[2] and A[3]. may be set equal to zero if A[2] and A[3] are each less than A[1]. Those skilled in the art appreciate that other special ordered sets may be applicable and that the present invention encompasses all such special ordered sets. The present invention contemplates incorporating any suitable special ordered sets and associated problem-specific constraints into a lifted cover inequality to strengthen the lifted cover inequality. The lifted cover inequality generated using the first heuristic, whether or not strengthened through incorporation of one or more special ordered sets and associated problem-specific constraints, may be deemed a cut if objective values in an LP relaxation solution received from IP solver 18 violate the lifted cover inequality.

In some cases, no lifting may have resulted from optimizer engine 16 applying the first heuristic, such that all the lifting coefficients (α−1) in the lifted cover inequality (8) are equal to zero. In one embodiment, if the coefficients of some or all the binary variables not in the cover C are larger then the coefficient of some or all the variables in the cover C, then it may be impossible to lift the variables in the cover C. As a result, an upper cutoff may exist above which no lifting is possible. For example, if A[b] is the largest coefficient for binary variables in the cover C, the upper cutoff is in general equal to A[b]+cλ, where 0≦c≦1 and c is used to determine how large the lifting coefficient of x[b] may be. In general, a smaller c will result in a lower upper cutoff and larger lifting coefficients. Desirably, the upper cutoff is made as large as possible such that lifting is more likely.

If no lifting results from optimizer engine 16 applying the first heuristic, then optimizer engine 16 may strengthen cover inequality (6) through incorporation of one or more special ordered sets and corresponding problem-specific constraints in the manner described more fully above. For example only and not by way of limitation, if only at most one of the bids x[1], x[2], and x[3] may be awarded, a special ordered set is {x[1], x[2], x[3]}. If x[1] is in the cover C, the coefficients of x[2] and x[3], A[2] and A[3], may be set equal to zero if A[2] and A[3] are each less than A[1]. Those skilled in the art appreciate that other special ordered sets may be applicable in particular scenarios and that the present invention is intended to encompass all such special ordered sets. The present invention contemplates incorporating any suitable special ordered sets and associated problem-specific constraints into a cover inequality to strengthen the cover inequality. The strengthened cover inequality, incorporating one or more special ordered sets and associated problem-specific constraints, may be deemed a cut if objective values in an LP relaxation solution received from IP solver 18 violate the strengthened cover inequality.

In addition to possible strengthening of cover inequality (6), if no lifting results from optimizer engine 16 applying the first heuristic, then optimizer engine 16 applies a second heuristic in which binary variables having relatively large coefficients are treated as continuous variables. In one embodiment, this allows the binary variable with the largest coefficient in the cover C to be lifted. Optimizer engine 16 determines all lifting coefficients (α−1) in lifted cover inequality (8) in the manner described above using one or more of expressions (10a), (10b), and (10c), except that one or more of the A[i]'s are excluded according to the second heuristic to make lifting easier. In one embodiment, optimizer engine 16 will apply the second heuristic if no lifting occurs according to the first heuristic, whether or not cover inequality (6) has already been strengthened or a suitable cut has already been found using the strengthened cover inequality.

In one embodiment, optimizer engine 16 treats as a continuous variable each bid not in the cover C and having a variable coefficient greater than the upper cutoff. Optimizer engine 16 may receive the value of c as part of the resource allocation data received from file 14 or may select c as appropriate. In one embodiment, optimizer engine 16 typically selects c=0.5. Optimizer engine 16 may select any suitable value for c and may increase or decrease the value of c one or more times according to particular needs. In the above example, with A[b]=200 and c=0.5, the upper cutoff will be 200+(0.5)(50)=225 and any bid whose coefficient A[i]>225 will be treated as a continuous variable.

Optimizer engine 16 analyzes resulting lifted cover inequality (8) in an effort to determine whether the objective values—the values in the LP relaxation solution for all of the variables in the demand constraint—violate lifted cover inequality (8). If these objective values violate lifted cover inequality (8), then an appropriate cut has been found, optimizer engine 16 incorporates the cut in the integer program, and the resulting enhanced integer program is communicated to IP solver 18 for generation of a solution. The present invention contemplates strengthening a lifted cover inequality generated using the second heuristic through incorporation of one or more special ordered sets and associated problem-specific constraints, before or after determining whether the lifted cover inequality is deemed a suitable cut. If objective values in the LP relaxation solution do not violate lifted cover inequality (8), such that the lifted cover inequality is not deemed a suitable cut, optimizer engine 16 may incorporate one or more additional constraints, which in one embodiment are not reflective of any special ordered sets, into the maximization problem set forth in (9a) through (9d) to eliminate the current cover C and generate a new cover C.

For example, if the current cover C includes the awarded bids x[1] and x[2], corresponding to a solution that z[1]=z[2]=1, then in one embodiment an additional constraint might be that z[1]+z[2]÷1, making it impossible to have both z[1]=1 and z[2]=1 simultaneously. After incorporating an additional constraint, optimizer engine 16 reoptimizes using IP solver 18 to generate a new cover C, lifts the new cover C in the manner described above, and determines whether a suitable cut has been found. The procedure iterates in this manner until optimizer engine 16 finds an acceptable number of cuts, optimizer engine 16 incorporates these cuts into the integer program to generate one or more enhanced integer programs, and IP solver 18 generates an acceptable solution to at least one of the enhanced integer programs. Through the process of generating multiple covers C and applying multiple lifting approaches, optimizer engine 16 is in general able to generate many cuts that would otherwise be overlooked, which provides an important technical advantage.

Operation of optimizer 10 with respect to the cutting process of the present invention will be further described using a very simple example. Those skilled in the art will appreciate that optimizer 10 may be used with respect to many other suitable optimization scenarios and that the present invention is intended to encompass all such scenarios. Suppose that for a particular lane we have the following demand constraint, an exemplary and more specific version of demand constraint (2):

$$200x[1]+200x[2]+200x[3]+200x[4]+250x[5]+y[6] \geq 250, \quad (11)$$

where $x[1]$, $x[2]$, $x[3]$, $x[4]$, and $x[5]$ are binary variables that correspond to carrier bids and $y[6]$ is a continuous variable corresponding to a carrier reserve bid. Also suppose that the unit prices P[bl] of the bids on the lane are in increasing order as follows: P[1l]=$1.10, P[2l]=$1.20, P[3l ]=$1.30, P[4l]=$1.40, P[5l]=$1.50, and P[6l]=$2.00. Further suppose that bids corresponding to $x[1]$ and $x[4]$ are the same bid submitted in different rounds and therefore constitute a special ordered set having the problem-specific constraint $x[1]+x[4] \leq 1$. In this case, although the most optimal integral solution is $x[1]=1$ and $y[6]=50$, the LP relaxation solution will instead yield $x[1]=1$, $x[2]=0.25$, and $x[3]=x[4]=x[5]=y[6]=0$. This solution, which includes the fractional value $x[2]=0.25$, is undesirable since it cannot in reality be implemented because $x[2]$ is a binary variable that must have "0" or "1" as its value. Optimizer engine 16 generates at least two cuts in this example—a first cut in the form of a violated cover inequality strengthened according to a special ordered set and a second cut in the form of a violated lifted cover inequality—to prevent IP solver 18 from generating this fractional solution.

First, to find an appropriate cover C, optimizer engine 16 communicates to IP solver 18 an appropriate maximization problem that is a more specific version of the maximization problem set forth in (9a) through (9d) above:

$$\text{Max } \{z[1]+0.25z[2] \text{ subject to } 200z[1]+200z[2]<250\} \quad (12)$$

Note that $z[3]$, $z[4]$, $z[5]$, and $w[6]$ are not included in maximization problem (12) because their coefficients are the values of $x[3]$, $x[4]$, $x[5]$, and $y[6]$, which are equal to zero in this example. Since $x[4]=0$, incorporating the special ordered set $\{x[1], x[4]\}$ and its corresponding additional problem-specific constraint, $z[1]+z[4] \leq 1$, into maximization problem (12) would not be helpful in this example. In typical situations involving less simplified optimization scenarios, however, the incorporation of such special ordered sets and corresponding problem-specific constraints may dramatically improve the strength of the cuts that optimizer engine 16 generates and provides an important technical advantage over previous techniques. The solution to maximization problem (12) is that $z[1]=1$ and $z[2]=0$, which means that the cover C includes only $x[1]$ (C=$\{x[1]\}$). Based on the cover C received from IP solver 18 and using a more specific equation corresponding to (4), optimizer engine 16 computes:

$$\lambda=250-(200+0)=50 \quad (13)$$

The resulting more specific cover inequality corresponding to cover inequality (6) is then:

$$x[2]+x[3]+x[4]+x[5]+y[6]/50 \geq 1 \quad (14)$$

which is violated in this simple example, since the lefthand side equals 0.25 when $x[2]=0.25$ and $x[3]=x[4]=x[5]=y[6]=0$. The cover inequality (14) eliminates the undesirable fractional solution $x[2]=0.25$ when $x[1]=1$. To see this, note that if the bid corresponding to $x[1]$ is awarded, such that $x[1]=1$, then fifty additional units are needed to satisfy the demand. This implies that one of the bids corresponding to $x[2]$, $x[3]$, $x[4]$, and $x[5]$ must be awarded in whole or the reserve bid corresponding to $y[6]$ must be awarded fifty units. Cover inequality (14) summarizes this logic.

The potential cut embodied in cover inequality (14) may be strengthened if optimizer engine 16 is able to lift $x[1]$. Recall that in this simple example $x[1]$ is the only one of the variables $x[1]$, $x[2]$, $x[3]$, $x[4]$, $x[5]$, and $y[6]$ that is in the cover C. Optimizer engine 16 applies the first heuristic and the appropriate expression (10a), (10b), or (10c) to determine the lifting coefficient ($\alpha$–1) for $x[1]$. Since in this example $A[1]=A[2]=A[3]=A[4]=200$ and $A[5]=250$, such that the largest coefficient for variables not in the cover C is $A[5]=250$, optimizer engine 16 applies expression (10a) with m=0 to obtain $$(A[0]=0) \leq (A[b]=A[1]=200) \leq (A[0]+A[5]-\lambda=250-50=200) \quad (15)$$

which yields $$\alpha=m+1=1 \quad (16)$$

and thus ($\alpha$–1)=0. The lifting coefficient ($\alpha$–1)=0 indicates that in this example no lifting will occur as a result of the first heuristic. Note that since expressions (10a), (10b), and (10c) were derived with the variable coefficients being in decreasing order, A[1] in expression (10a) becomes A[5]= 250 in the more specific expression (15) set forth above.

In this example, $x[1]$ was not lifted because the coefficient of $x[5]$, $A[5]=250$, was too large. In one embodiment, if a bid exists that satisfies the full amount of the demand D[1], then no lifting occurs according to the first heuristic. Although in this example there is no lifting after application of the first heuristic, the potential cut that cover inequality (14) embodies may be strengthened through incorporation of one or more special ordered sets and corresponding problem-specific constraints. In this example, as discussed above, since only one of the bids corresponding to $x[1]$ and $x[4]$ may be awarded, and since $x[1]$ is in the cover C and assumed to have been awarded in cover inequality (14), $x[4]=0$ and a suitable cut is as follows:

$$x[2]+x[3]+x[5]+y[6]/50 \geq 1 \quad (17)$$

Since no lifting resulted from application of the first heuristic, optimizer engine 16 applies the second heuristic to lift the cover C. Optimizer engine 16 treats $x[5]$ as a continuous variable since, in this example, with A[b]=A[1]= 200 and c=0.5 the upper cutoff is 200+(0.5)(50)=225 and A[5]=250>225. The cover inequality (14) becomes:

$$x[2]+x[3]+x[4]+5x[5]+y[6]/50 \geq 1 \quad (18)$$

The coefficient of $x[5]$ (250/50=5) is determined according to the second summation in cover inequality (6) since $x[5]$ is treated as a continuous variable. Cover inequality (18) is weaker than cover inequality (14) because the coefficient of $x[5]$ is larger in cover inequality (18) than in cover inequality (14).

The variable in the cover C having the largest coefficient remains x[1], which optimizer engine 16 lifts according to expression (10b). With m=1, expression (10b) becomes:

$$(A[0]+A[5]-\lambda=200) \leq (A[b]=A[1]=200) \leq (A[0]+A[5]=250) \quad (19)$$

which yields $$\alpha = m+2-(A[5]-A[b])/\lambda = 3-(250-200)/50 = 2 \quad (20)$$

and thus the lifting coefficient for x[1] is ($\alpha-1$)=1. Note that since expressions (10a), (10b), and (10c) were derived with the variable coefficients being in decreasing order, A[1] in expression (10b) becomes A[5]=250 in the more specific expression (19) set forth above.

The resulting cut, in the form of a more specific version of lifted cover inequality (8), is:

$$x[1]+x[2]+x[3]+x[4]+5x[5]+y[6]/50 \geq 2 \quad (21)$$

Both of the cuts (17) and (21) are violated. Neither of the cuts is stronger than the other. In general, there is a tradeoff between the tightness of the variable coefficients in a particular cover inequality and the ability to generate a corresponding lifted cover inequality. Although cut (17) includes more desirable coefficients for x[4] and x[5], cut (21) is more desirable with respect to lifting. Optimizer engine 16 incorporates both cuts (17) and (21) into the applicable integer program and communicates the resulting enhanced integer program to IP solver 18 for solution. In this example, the LP relaxation solution optimizer engine 16 receives from IP solver 18 will be x[1]=1 and y[6]=50, which is the optimal solution.

In addition to or instead of the cutting process described above, which may be performed in whole or in any appropriate part, optimizer engine 16 may perform a prioritizing process to increase the speed, efficiency, and accuracy with which system 8 optimizes the allocation of resources. In one embodiment, the prioritizing process of the present invention relies at least in part upon the problem-specific set-covering structure of optimizer engine 16. The priorities optimizer engine 16 generates using the prioritizing process determine the order in which binary variables corresponding to bids are branched on within branch-and-bound tree 30 when IP solver 18 attempts to solve the corresponding integer program, which may have a significant impact with respect to solving the integer program. Priorities may be incorporated into a standard integer program to generate an enhanced integer program and may also be incorporated into an otherwise enhanced integer program, one incorporating a cut for example, to generate a further enhanced integer program. The higher the priority of a bid, the earlier its associated variable is branched upon within tree 30. As an example, in tree 30 discussed with reference to FIG. 2. x[1] has been branched on before x[2], possibly based on the relative priorities of x[1] and x[2], and x[2] has been branched on before x[3], possibly based on the relative priorities of x[2] and x[3].

Optimizer engine 16 may specify a branch direction according to the priority instead of or in addition to determining a branching order. In one embodiment, an "up" branch corresponds to a bid being awarded and to the associated binary variable having "1" as its value. Analogously, a "down" branch may correspond to a bid being rejected and to the associated binary variable having "0" as its value. If in the optimal solution a particular binary variable has "1" as its value, x[1]=1 for example, then exploring the associated "up" branch (x[1]=1 in this example) is more likely to yield an acceptable solution than exploring the associated "down" branch (x[1]=0 in this example).

To assign a priority to a bid, optimizer engine 16 first assesses how good or how bad the bid is relative to some or all of the other bids. A relatively good bid will be assigned a high priority and an up branch direction. A relatively bad bid will be assigned a low priority and a down branch direction. For each lane, optimizer engine 16 identifies all the bids that span the lane. In one embodiment, the bids with the lowest unit prices are then selected in order of increasing unit price until the total bid amount for all such selected bids exceeds a threshold value, for example, a cutoff factor times the given demand. The unit price of the last such bid selected is defined as the cutoff unit price for the lane, Cutoff[l], and is used for comparison with the unit prices of the other bids. If the total bid amount for all bids is less than the demand, reserve bids may be used in determining the cutoff unit price. The bids with unit prices better than the cutoff unit price are assigned a positive priority value for the lane and bids having unit prices less than or equal to the cutoff unit price are assigned a negative priority value for the lane. In this manner, the cutoff unit price for the lane may be used to estimate the savings or extra cost associated with each bid spanning the lane. Optimizer engine 16 assigns a priority to a bid based on the sum of its priority values across all the lanes the bid spans.

The priority value of a bid b on lane l, Value[bl], is:

$$\text{Value}[bl] = (\text{Cutoff}[l] - P[bl])A[bl] \quad (22)$$

where Cutoff[l] is the cutoff unit price for the lane, P[bl] is the bid unit price for the lane, and A[bl] is the bid amount for the lane in units. If P[bl]<Cutoff[l], then Value[bl] is positive and the priority value will be positive. If P[bl] $\geq$ Cutoff[l], then Value[bl] is negative and the priority value will be negative. As a simple example, if the cutoff unit price Cutoff[l]=180, the bid unit price P[bl]=150, and the bid amount in units A[bl]=50, then the priority value for the bid on that lane is:

$$\text{Value}[bl] = (180-150)50 = 1500 \quad (23)$$

As discussed above, the priority for the bid is the sum of its priority values across all the lanes that the bid spans.

Priorities for bids may be adjusted according to fixed costs or other suitable carrier constraints. In one embodiment, a shipper may specify a fixed cost F[cg] for awarding business to carrier c in lane group g. As discussed above, a lane group is a group of lanes associated in some manner according to the needs of the shipper. one or more carriers, or otherwise. For each such fixed cost F[cg], optimizer engine 16 identifies all the bids of carrier c in lane group g with positive priorities, the number of such bids being denoted as n. Optimizer engine 16 then subtracts F[cg]/n from each such priority to adjust the priorities of these bids. The absolute value of the adjusted sum is the adjusted priority for the bid. As a simple example, suppose that F[cg]=90 and that priorities for the bids corresponding to the variables x[1], x[2], and x[3] are Priority[$x_1$]=100, Priority[$x_2$]=50, and Priority[$x_3$]=15, respectively. The adjusted priorities for x[1], x[2], and x[3] will then be |100−90/3|=|70|, |50−90/3|=|20|, and |15−90/3|=|−15|, respectively. If the adjusted priority is positive, as is the case for the bids that correspond to x[1] and x[2], the branch direction will be up. If the adjusted priority is negative, as is the case for the bid that corresponds to x[3], the branch direction is down.

The prioritizing process of the present invention provides important technical advantages over standard approaches that use a greedy heuristic to assign a priority to each bid according to its weighted unit price across all the lanes the bid spans. For example, a previous technique computes the weighted unit price for a bid across all lanes j the bid spans as equal to:

$$\left(\sum_j B[j]U[j]\right) / \left(\sum_j B[j]\right) \qquad (24)$$

where B[j] is the bid amount and U[j] is the unit price on a particular lane j. A cutoff price is determined and the weighted unit price of each bid, across all lanes the bid spans, is compared with the cutoff price. Bids having weighted unit prices below the cutoff price are assigned positive priorities and bids having weighted unit prices below the cutoff price are assigned negative priorities. Another previous technique involves ordering all bids according to their weighted unit price across all lanes. Once a bid is selected, it will be assigned a positive priority or an "up" branch direction. Any bids that compete with the selected bid are assigned negative priorities or "down" branch directions. This procedure iterates until no bids remain.

Such previous approaches are generally unsuitable for carrier bid optimization scenarios since, for example only and not by way of limitation, (a) each bid may span different lanes and lane bundles than some or all other bids, and (b) lanes in different geographic regions may differ, sometimes dramatically, in price. In contrast to such previous techniques, the prioritizing process of the present invention treats each lane separately and deals effectively with carrier bid optimization and many other resource allocation scenarios, providing an important technical advantage. In one embodiment, the prioritizing process of the present invention, with or without the cutting process described above, allows optimizer 10 to consistently outperform systems relying upon previous techniques discussed above. The prioritizing process may be particularly effective in generating acceptable solutions in situations in which relatively strong carrier selection constraints exist.

Figure 3:
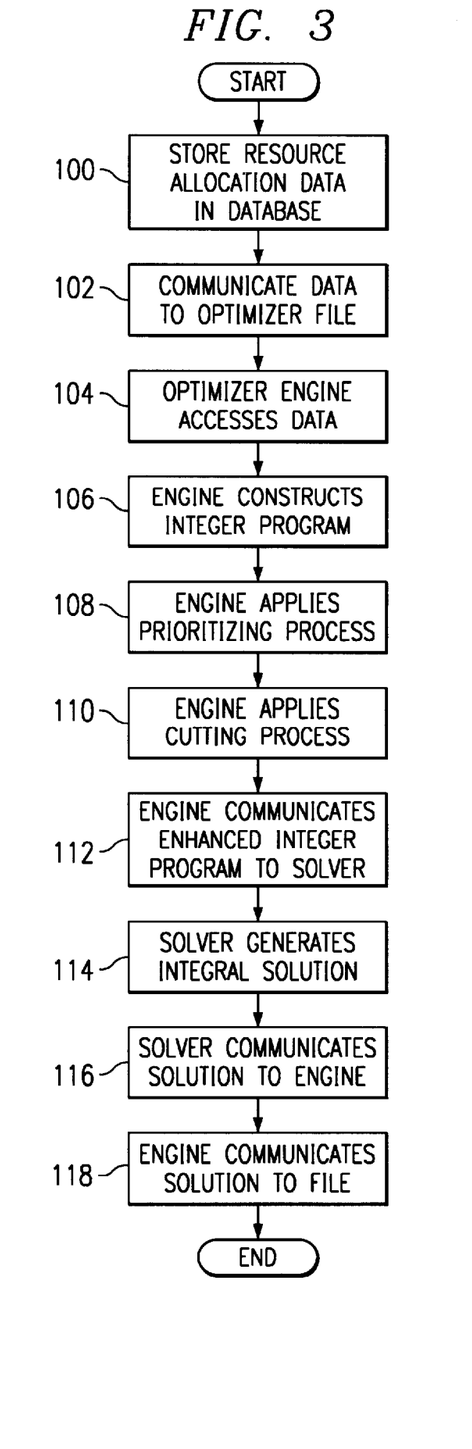
FIG. 3 is a flow chart illustrating an exemplary method for optimizing the allocation of a resource according to the present invention.

FIG. 3 is a flow chart illustrating an exemplary method of optimizing the allocation of a resource according to the present invention. The method begins at step 100, where appropriate resource allocation data is stored in database 12. At step 102, some or all of the resource allocation data is communicated to optimizer file 14 for storage and possible viewing using the associated GUI. Optimizer engine 16 accesses some or all of the resource allocation data stored in file 14 at step 104 and constructs a standard integer program according to the data reflecting the optimization problem being addressed at step 106. Optimizer engine 16 may apply the prioritizing process to generate one or more priorities in accordance with the data at step 108 and, instead of or in addition to generating priorities, may apply the cutting process to generate one or more cuts in accordance with the data at step 110.

In one embodiment, optimizer engine 16 generates priorities for all bids at step 108 and generates as many cuts as it is able to generate at step 110, making the cuts as strong as it is able to make them, such that optimizer engine 16 would be unable to further enhance the integer program reflecting the particular optimization scenario. In another embodiment, optimizer engine 16 may generate only limited priorities and cuts to suitably enhance the integer program to facilitate or enable its solution. After applying the prioritizing process, the cutting process, or both of these processes to enhance the standard integer program, optimizer engine 16 communicates the enhanced integer program to IP solver 18 at step 112. IP solver 18 generates an integral solution to the integer program at step 114 and communicates the solution to optimizer engine 16 at step 116. At step 118, optimizer engine 16 communicates the solution to file 14, with or without input from a user of optimizer 10, and the method ends. The user may be provided with the solution using the GUI associated with file 14 and given the option to store the solution in file 14, to provide suitable additional information and request another solution, or both of these options.

Figure 4:
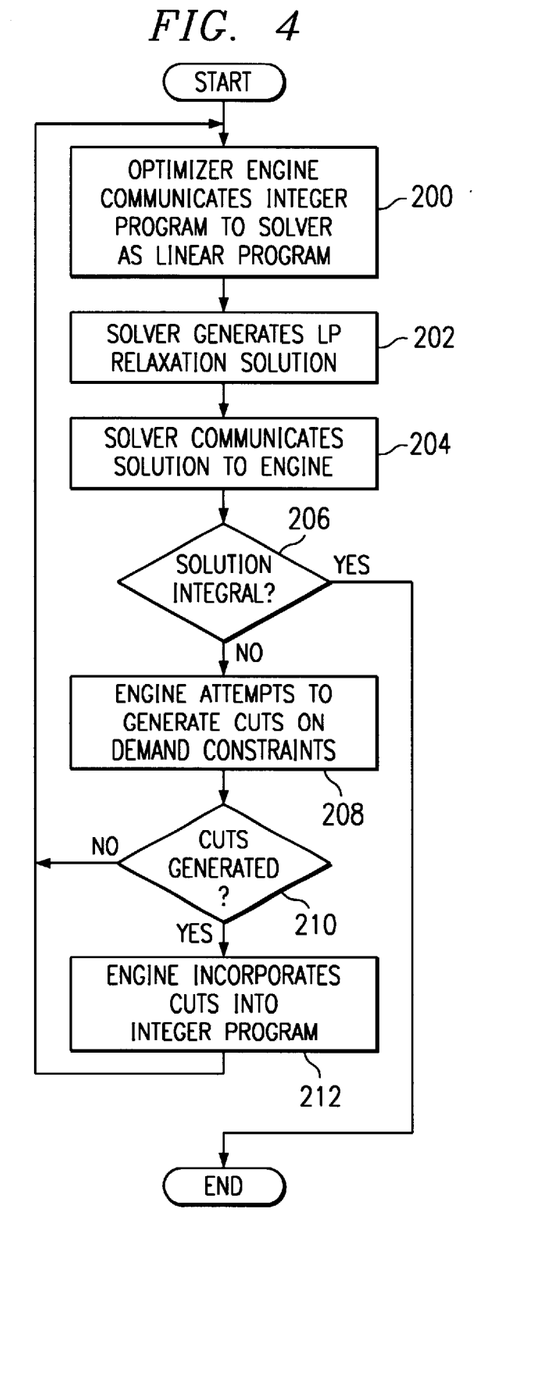
FIG. 4 is a flow chart illustrating an exemplary cutting process according to the present invention.

FIG. 4 illustrates an exemplary cutting process according to the present invention. In one embodiment, optimizer engine 16 applies the cutting process at step 110 described above with reference to FIG. 3. The process begins at step 200, where optimizer engine 16 communicates the standard integer program to IP solver 18 as a linear program. IP solver 18 generates an LP relaxation solution to the linear program at step 202 and communicates the LP relaxation solution to optimizer engine 16 at step 204. If the LP relaxation solution is not an integral solution at step 206, at step 208 optimizer engine 16 attempts to generate one or more suitable cuts on the demand constraint for each lane, as described more fully above and also below with reference to FIG. 5. If one or more suitable cuts have been generated at step 210, then optimizer engine 16 incorporates the cuts into the integer program to generate an enhanced integer program, and the process returns to step 200. If the LP relaxation solution received from IP solver 18 is integral at step 206 or if no suitable cuts have been generated at step 210, the process ends.

Figure 5:
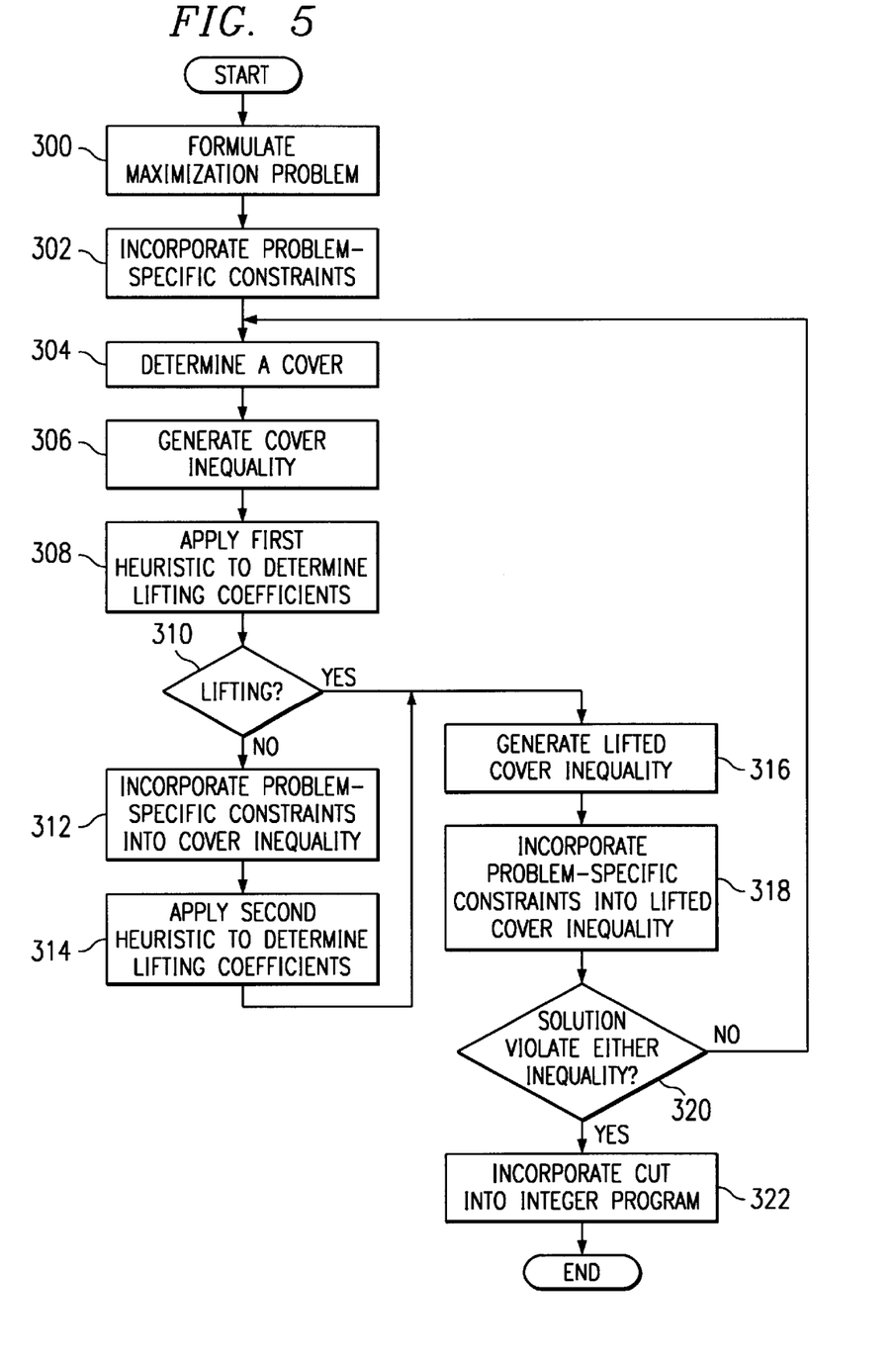
FIG. 5 is a flow chart illustrating exemplary further details of the cutting process of the present invention.

FIG. 5 illustrates exemplary further details of the cutting process of the present invention. In one embodiment, optimizer engine 16 implements this more detailed process in connection with steps 208 through 212 described above with reference to FIG. 3. The process begins with optimizer engine 16 attempting to find an appropriate cover C using IP solver 18 or otherwise. In one embodiment, for each lane involved in the optimization scenario, optimizer engine 16 formulates and communicates to IP solver 18 at step 300 a maximization problem as set forth in (9a) through (9d) appropriate for the demand constraint (2). Optimizer engine 16 may formulate the maximization problem such that it incorporates one or more additional problem-specific constraints, as indicated at step 302. At step 304, IP solver 18 determines the sets $C_1$ and $C_2$ that are in the cover C and either: (a) determines and communicates to optimizer engine 16 the cover C, or (b) communicates $C_1$ and $C_2$ to optimizer engine 16 for determination of the cover C. Once the cover C is found or otherwise determined at step 304, optimizer engine 16 generates an appropriate cover inequality at step 306.

The process continues with optimizer engine 16 attempting to lift the cover C in the manner described more fully above. In one embodiment, optimizer engine 16 applies the first heuristic at step 308 to attempt to determine the lifting coefficients ($\alpha$-1) needed to lift the cover C and generate a corresponding lifted cover inequality. If the cover C has been suitably lifted at step 310 according to the first heuristic, the process proceeds directly to step 316 where the corresponding lifted cover inequality is generated. If the cover C has not been suitably lifted at step 310 in accordance with the first heuristic, optimizer engine 16 may incorporate one or more problem-specific constraints into the cover inequality at step 312. At step 314, optimizer engine 16 applies the second heuristic to determine the lifting coefficients ($\alpha$-1) needed to lift the cover C and generate a corresponding lifted cover inequality. At step 316, optimizer engine 16 generates the lifted cover inequality corresponding to the lifting coefficients determined either at step 308 according to the first heuristic or at step 314 according to the second heuristic. Optimizer engine 16 may incorporate one or more additional problem-specific constraints into the lifted cover inequality at step 318 to strengthen the lifted cover inequality.

At step 320, if objective values in the LP relaxation solution from IP solver 18 violate either the cover inequality generated at step 306, the cover inequality generated at step 312, or both the cover inequalities, then optimizer engine 16 incorporates any violated cover inequalities into the integer program as cuts at step 322. In addition, at step 320, if objective values in the LP relaxation solution from IP solver 18 violate either the lifted cover inequality generated at step 316, the lifted cover inequality generated at step 318, or both the lifted cover inequalities, then optimizer engine 16 also incorporates any violated lifted cover inequalities into the integer program as cuts at step 322. After cuts have been incorporated into the integer program at step 322 to (generate a suitable enhanced integer program, the process ends. In the alternative, if objective values in the LP relaxation solution from IP solver 18 do not violate one or more of the cover inequalities and lifted cover inequalities at step 320, the process returns to step 304, where optimizer engine 16 eliminates the current cover C and reoptimizes using IP solver 18 to determine a new cover C. In one embodiment, the process may return to step 304 for reoptimization even if one or more inequalities are violated at step 320 and an enhanced integer program generated at step 322, such that optimizer engine 16 may generate one or more additional cuts for incorporation into the enhanced integer program before the enhanced integer program is communicated to IP solver 18. The process iterates until an iteration limit is reached or until the integer program is deemed to incorporate cuts appropriate in number and kind for suitable solution using IP solver 18.

Figure 6:
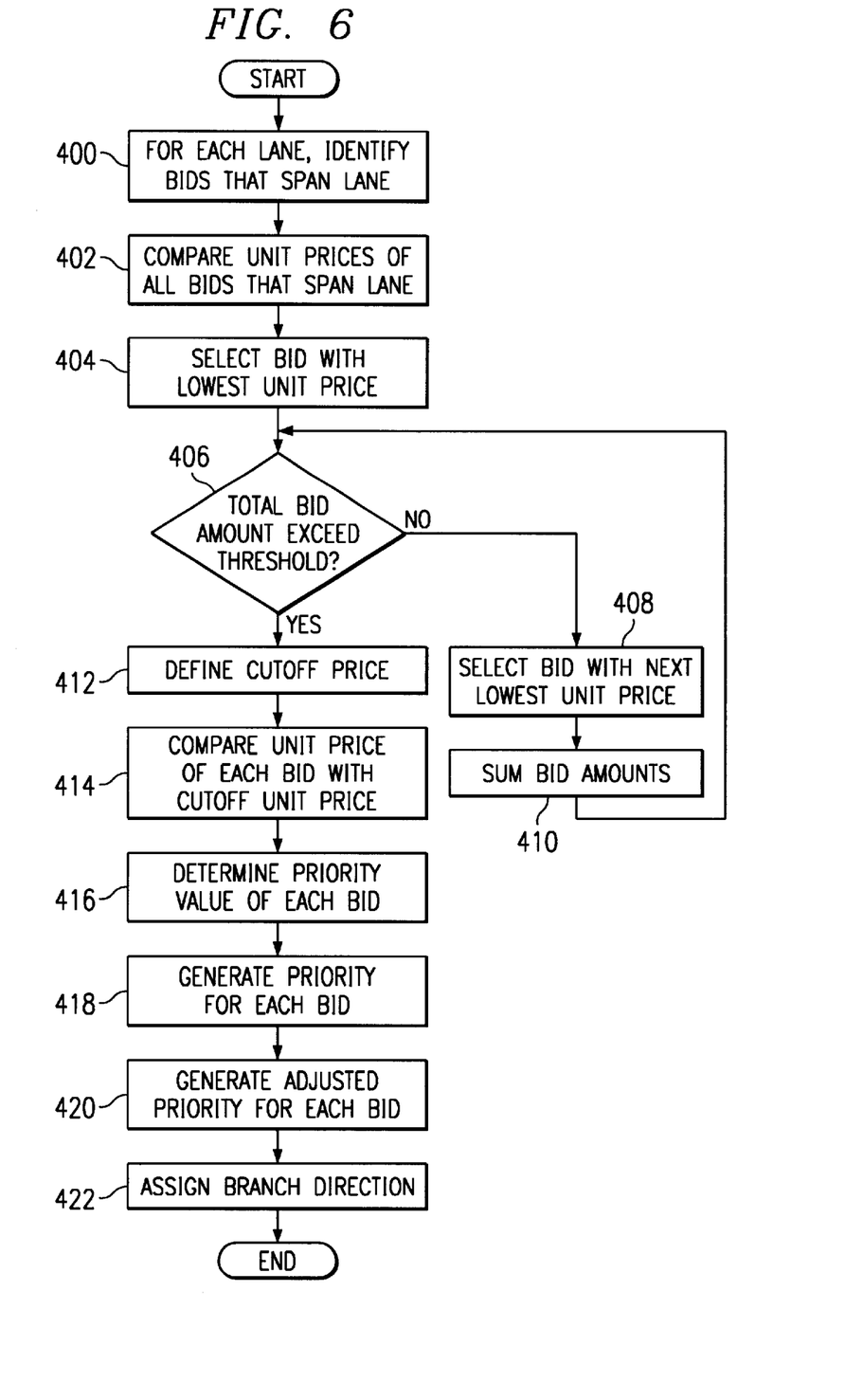
FIG. 6 is a flow chart illustrating an exemplary prioritizing process in accordance with the present invention.

FIG. 6 is a flow chart illustrating an exemplary prioritizing process according to the present invention. In one embodiment, optimizer engine 16 applies the prioritizing process at step 108 described above with reference to FIG. 3. The process begins at step 400 where, for each lane, optimizer engine 16 identifies all the bids that span the lane. Optimizer engine compares the unit prices of these bids at step 402 and selects the bid with the lowest unit price at step 404. If the total bid amount does not exceed a threshold value at step 406, for example, a cutoff factor times the given demand, optimizer engine selects the bid with the next lowest unit price at step 408, sums the bid amounts for all selected bids at step 410, and the process returns to step 406. If the total bid amount exceeds the threshold value at step 406, optimizer engine 16 defines the cutoff unit price for the lane at step 412 as the unit price of the last bid selected.

At step 414, optimizer engine compares the unit prices of each bid with the cutoff unit price and, at step 416, determines the priority value of each bid according to the comparison. In one embodiment, the bids with unit prices better than the cutoff unit price are assigned a positive priority value for the lane and the bids having unit prices less than or equal to the cutoff unit price are assigned a negative priority value for the lane. The present invention contemplates assigning priority values in another suitable manner based on the comparison of bid unit prices with the cutoff unit price. At step 418, optimizer engine 16 generates a priority for each bid spanning the lane that, in one embodiment, is equal to the sum of the priority values across all the lanes the bid spans. At step 420, optimizer engine 16 may generate an adjusted priority for each bid based on fixed costs or other suitable carrier constraints, as discussed more fully above. Optimizer engine 16 may also assign a branch direction for one or more bids at step 422 according to the priorities or adjusted priorities of the bids, and the process ends. In one embodiment, optimizer engine 16 may generate and incorporate one or more priorities or adjusted priorities after it is determined that IP solver 18 is unable to solve the applicable optimization problem with requisite speed, efficiency, and accuracy.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-based system for optimizing the allocation of a resource, comprising:
    an optimizer file containing resource allocation data comprising a demand and a plurality of bids for the resource, each bid comprising at least a unit price for the resource;
    an optimizer engine coupled to the file and operable to receive the data, the engine operable to generate priorities for at least some bids according to their unit prices, the engine operable to generate an integer program according to the data and to communicate the priorities in association with the integer program; and
    a solver coupled to the engine and operable to receive the priorities and integer program, the solver operable to generate a solution to the integer program using the priorities, the solution optimizing the allocation of the resource subject to the demand and the bids;
    the solver branching, within a branch-and-bound tree data structure, on at least one variable corresponding to at least one bid according to the priority of the bid.

2. The system of claim 1, wherein the resource is at least one shipping lane, the bids are carrier bids, and the solution optimizes the allocation of the lane among a plurality of carriers.

3. The system of claim 1, wherein the engine is operable to identify bids that span the resource and to determine a cutoff unit price for the resource, the engine operable to compare the unit prices of the bids that span the resource with the cutoff unit price in generating the priorities.

4. The system of claim 1, wherein the engine is operable to identify bids that span the resource and to order the bids according to their unit prices, the engine operable to select the bids with the lowest unit prices until the sum of bid amounts for the selected bids exceed a threshold, the unit price of the last selected bid being a cutoff unit price, the engine operable to compare the unit prices of the bids that span the resource with the cutoff unit price to generate priority values for the bids that span the resource.

5. The system of claim 4, wherein the threshold comprises a cutoff factor times the demand.

6. The system of claim 4, wherein the engine is operable to determine the priority of a particular bid according to the sum of its priority values across a plurality of resources.

7. The system of claim 1, wherein the engine is operable to adjust the priority of a bid according to a fixed cost associated with a submitter of the bid.

8. The system of claim 1, wherein the data further comprises a fixed cost F associated with a submitter of at least some of the bids, the engine operable to identify n bids of a submitter having positive priorities and to subtract F/n from the priorities of these bids to adjust the priorities of these bids.

9. The system of claim 1, wherein the engine is operable to assign a branch direction to a bid according to its priority.

10. The system of claim 1, wherein the priorities collectively specify an order in which the solver branches on variables corresponding to bids.

11. An optimizer engine operating on at least one computer for optimizing the allocation of a resource, wherein:
the engine is operable to receive resource allocation data comprising a demand and a plurality of bids for the resource, each bid comprising at least a unit price for the resource;
the engine is operable to generate priorities for at least some bids according to their unit prices;
the engine is operable to generate an integer program according to the data; and
the engine is operable to communicate the priorities in association with the integer program to a solver for generation of a solution to the integer program using the priorities, the solution optimizing the allocation of the resource subject to the demand and the bids;
the priorities allowing the solver to branch, within a branch-and-bound tree data structure, on at least one variable corresponding to at least one bid according to the priority of the bid.

12. The engine of claim 11, wherein the resource is at least one shipping lane, the bids are carrier bids, and the solution optimizes the allocation of the lane among a plurality of carriers.

13. The engine of claim 11, wherein the engine is operable to identify bids that span the resource and determine a cutoff unit price for the resource, the engine operable to compare the unit prices of the bids that span the resource with the cutoff unit price in generating the priorities.

14. The engine of claim 11, wherein the engine is operable to identify bids that span the resource and to order the bids according to their unit prices, the engine operable to select the bids with the lowest unit prices until the sum of bid amounts for the selected bids exceed a threshold, the unit price of the last selected bid being a cutoff unit price, the engine operable to compare the unit prices of the bids that span the resource with the cutoff unit price to generate priority values for the bids that span the resource.

15. The engine of claim 14, wherein the threshold comprises a cutoff factor times the demand.

16. The engine of claim 14, wherein the engine is operable to generate the priority of a particular bid according to the sum of its priority values across a plurality of resources.

17. The engine of claim 11, wherein the engine is operable to adjust the priority of a bid according to a fixed cost associated with a submitter of the bid.

18. The engine of claim 11, wherein the data further comprises a fixed cost F associated with a submitter of at least some of the bids, the engine operable to identify n bids of a submitter having positive priorities and to subtract F/n from the priorities of these bids to adjust the priorities of these bids.

19. The engine of claim 11, wherein the engine is operable to assign a branch direction to a bid according to its priority.

20. The engine of claim 11, wherein the priorities collectively specify an order in which the solver is to branch on variables corresponding to bids.

21. A process operating on a computer for optimizing the allocation of a resource, comprising:
receiving resource allocation data comprising a demand and a plurality of bids for the resource, each bid comprising at least a unit price for the resource;
generating priorities for at least some bids according to their unit prices;
generating an integer program according to the data;
associating the priorities with the integer program; and
generating a solution to the integer program using the priorities, the solution optimizing the allocation of the resource subject to the demand and the bids;
generating the solution comprising branching, within a branch-and-bound tree data structure, on at least one variable corresponding to at least one bid according to the priority of the bid.

22. The process of claim 21, wherein the resource is at least one shipping lane, the bids are carrier bids, and the solution optimizes the allocation of the lane among a plurality of carriers.

23. The process of claim 21, further comprising:
identifying bids that span the resource;
determining a cutoff unit price for the resource; and
comparing the unit prices of the bids that span the resource with the cutoff unit price in generating the priorities.

24. The process of claim 21, further comprising:
identifying bids that span the resource;
ordering the bids according to their unit prices;
selecting the bids with the lowest unit prices until the sum of bid amounts for the selected bids exceed a threshold;
determining a cutoff unit price equal to the unit price of the last selected bid;
comparing the unit prices of the bids that span the resource with the cutoff unit price; and
generating priority values for the bids that span the resource according to the comparison.

25. The process of claim 24, wherein the threshold comprises a cutoff factor times the demand.

26. The process of claim 24, wherein the priority of a particular bid is determined according to the sum of its priority values across a plurality of resources.

27. The process of claim 21, further comprising adjusting the priority of a bid according to a fixed cost associated with a submitter of the bid.

28. The process of claim 21, wherein the data further comprises a fixed cost F associated with a submitter of at least some of the bids, further comprising:
identifying n bids of a submitter having positive priorities; and
subtracting F/n from the priorities of these bids to adjust the priorities of these bids.

29. The process of claim 21, further comprising assigning a branch direction to a bid according to its priority.

30. The process of claim 21, wherein the priorities collectively specify an order in which variables corresponding to bids are branched upon.

* * * * *